United States Patent [19]
Wittner et al.

[11] Patent Number: 5,239,593
[45] Date of Patent: Aug. 24, 1993

[54] OPTICAL PATTERN RECOGNITION USING DETECTOR AND LOCATOR NEURAL NETWORKS

[75] Inventors: Ben S. Wittner, Hartsdale; Keith Loris, Brooklyn, both of N.Y.

[73] Assignee: NYNEX Science & Technology, Inc., White Plains, N.Y.

[21] Appl. No.: 680,231

[22] Filed: Apr. 3, 1991

[51] Int. Cl.$^5$ .................. G06K 9/62; G06K 9/20; G06K 9/34
[52] U.S. Cl. .................. 382/14; 382/48; 382/7; 382/9; 395/21
[58] Field of Search .................. 382/14, 15, 26, 24, 382/22, 41, 43, 48, 7, 1, 9, 42; 395/21, 24, 25, 51

[56] References Cited

U.S. PATENT DOCUMENTS

| | | | |
|---|---|---|---|
| 4,876,731 | 10/1989 | Loris et al. | 382/40 |
| 4,941,122 | 7/1990 | Weideman | 395/22 |
| 4,945,494 | 7/1990 | Penz et al. | 395/24 |
| 5,014,219 | 5/1991 | White | 382/15 |
| 5,048,100 | 9/1991 | Kuperstein | 382/15 |
| 5,060,276 | 10/1991 | Morris et al. | 382/48 |

OTHER PUBLICATIONS

"A Neural Network Model for Selective Attention in Visual Pattern Recognition" by K. Fukushima, Biological Cybernetics 55,5-15 (1986).

Primary Examiner—David K. Moore
Assistant Examiner—Michael Cammarata
Attorney, Agent, or Firm—Kenneth Rubenstein; Loren C. Swingle

[57] ABSTRACT

A system for performing optical pattern recognition includes a first detector neural network for detecting the presence of a particular optical pattern in an input image and a second locator neural network for locating and/or removing the particular optical pattern from the input image. The detector network and the locator network both comprise nodes which can take on the $-1$, $+1$, or undefined states. The nodes are arranged in layers and each node in a layer has a location corresponding to a pixel in the input image. A particular application of this neural network is in finding the amount field on a check and removing the line which borders the amount field.

21 Claims, 19 Drawing Sheets

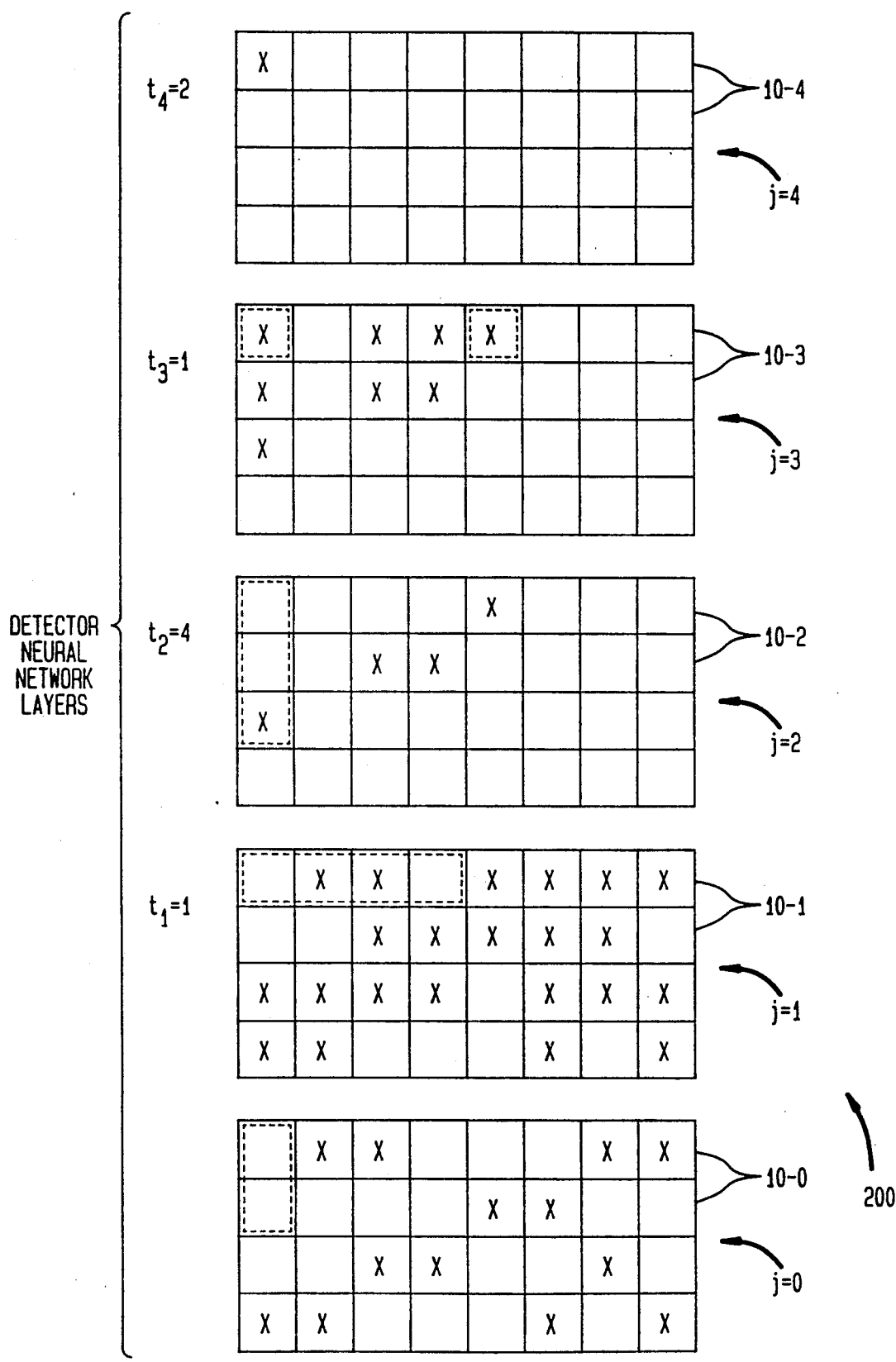

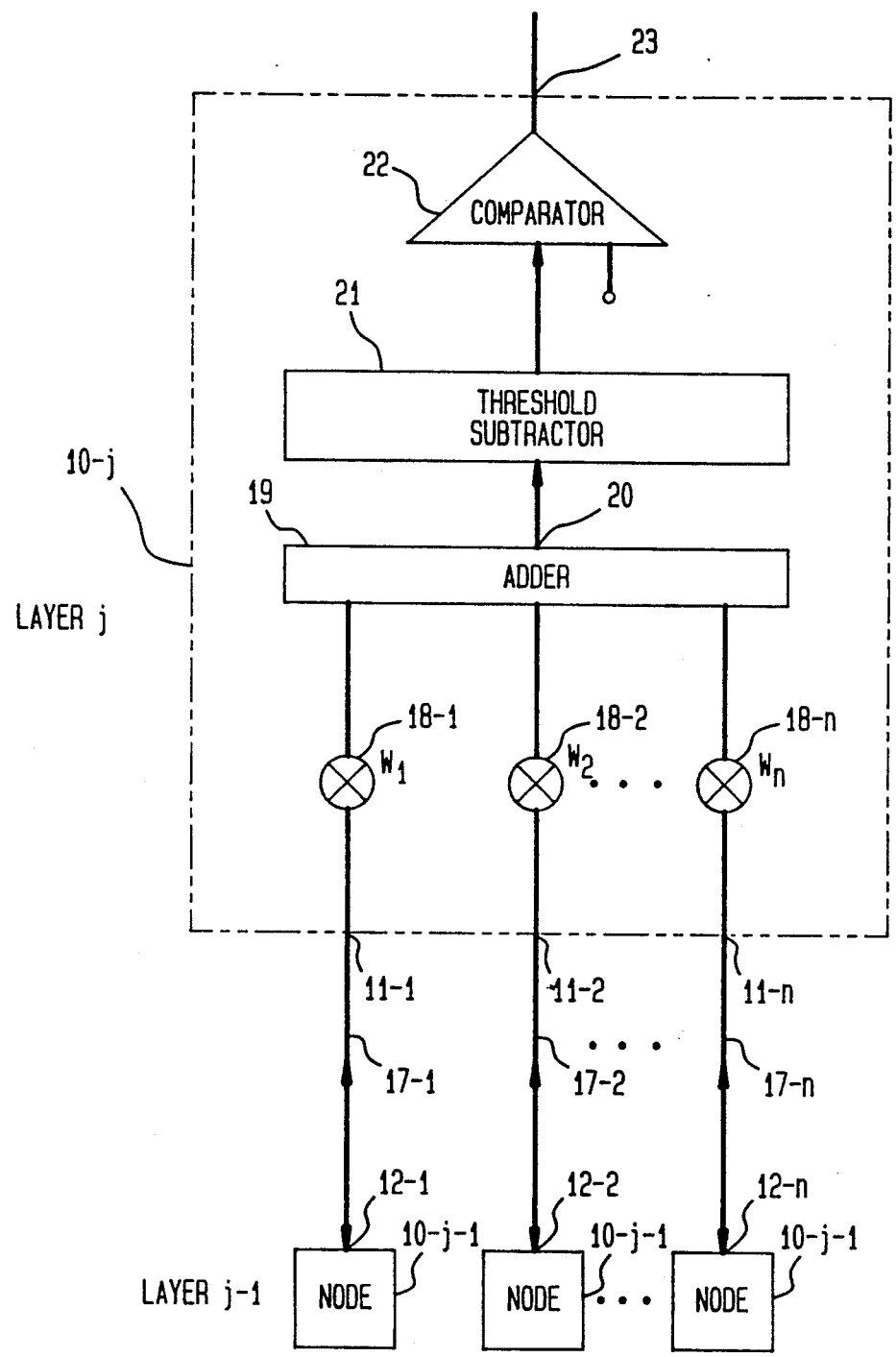

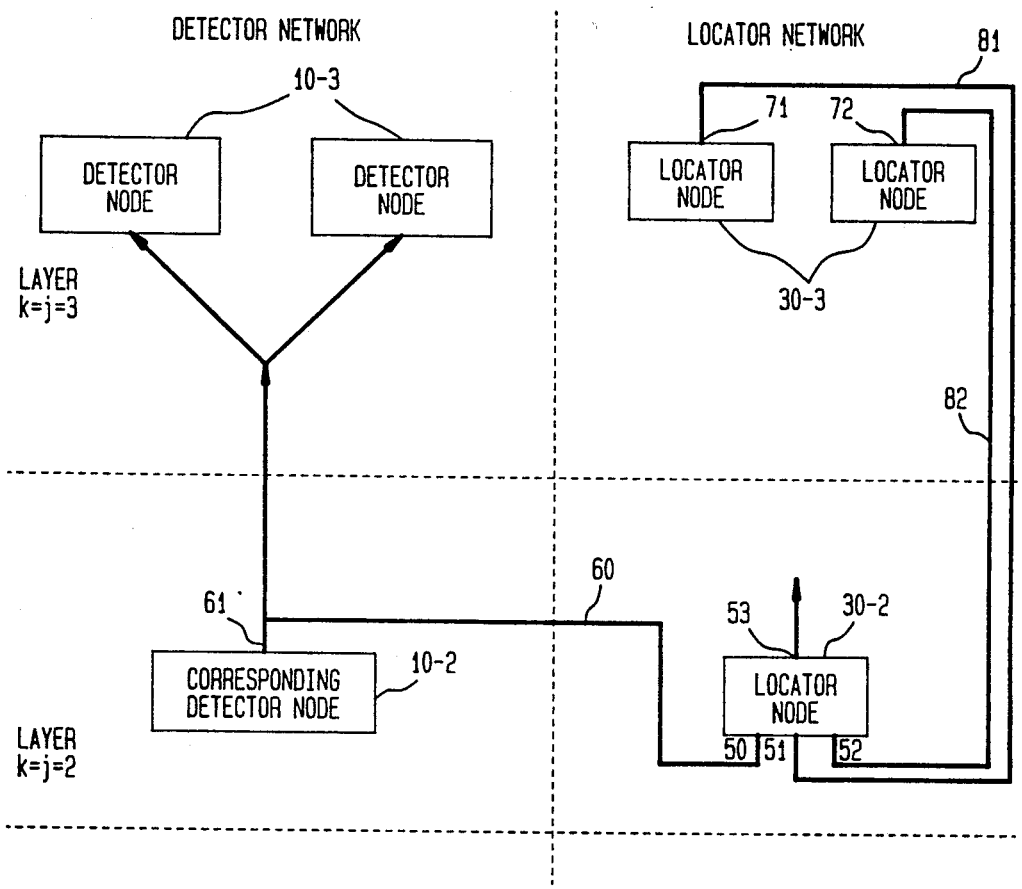

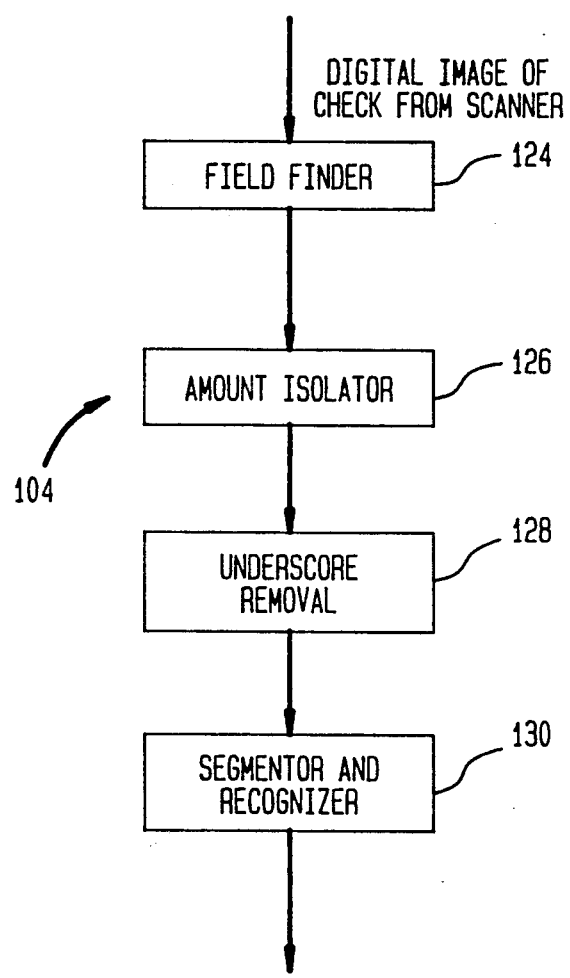

PROCESSING OF LAYER 1ℓ

PROCESSING OF LAYER 1u

PROCESSING OF LAYER 2ℓ

PROCESSING OF LAYER 2u

PROCESSING OF LAYER 3

PROCESSING OF LAYER 4

PROCESSING OF LAYER 5

PROCESSING OF LAYER 6

PROCESSING OF ALTERNATE LAYER 6

PROCESSING OF LAYER 6

PROCESSING OF LAYER 5

PROCESSING OF LAYER 4

PROCESSING OF LAYERS 3, 2ℓ, 2u

PROCESSING OF LAYER 1ℓ

PROCESSING OF LAYER 1u

FEATURE REMOVING OPERATION

FEATURE REMOVING OPERATION

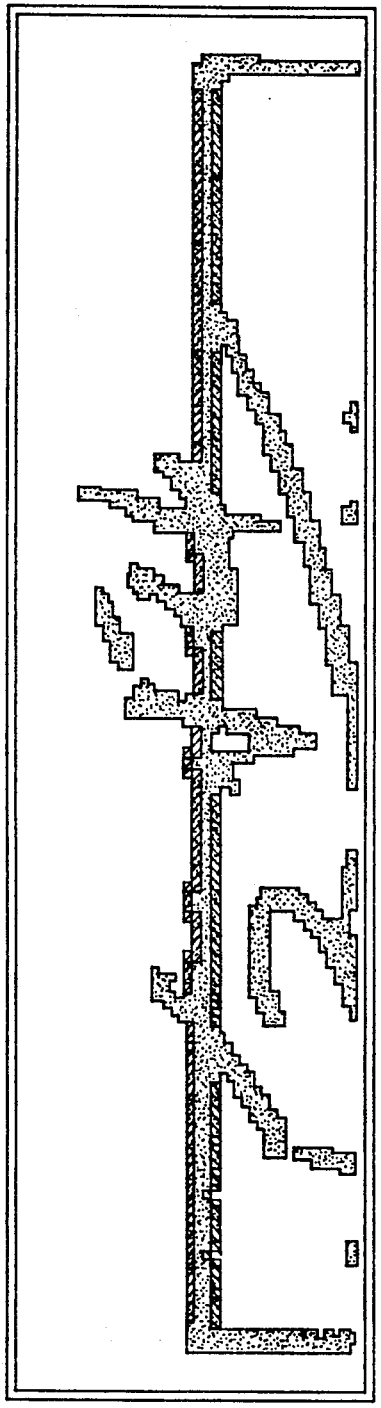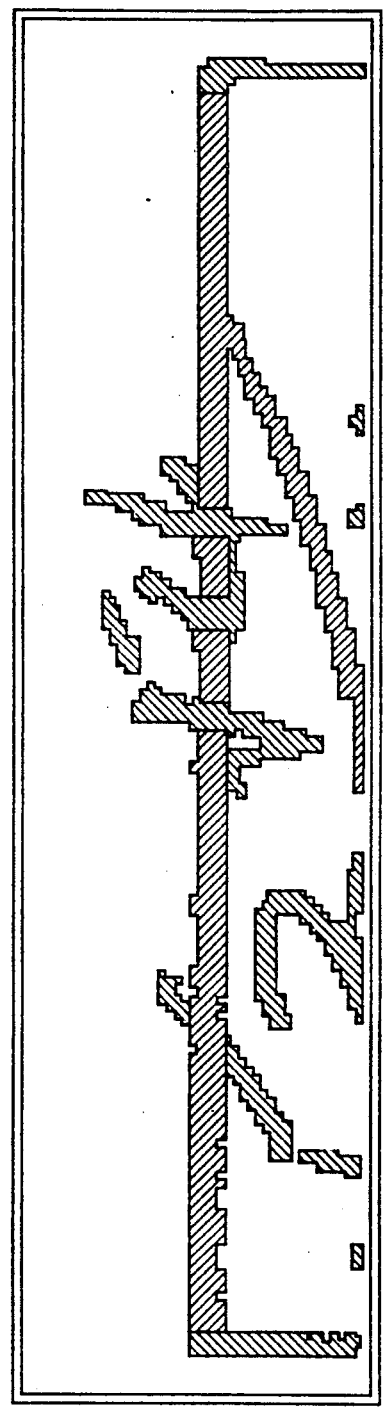
FIG. 14C — FEATURE REMOVING OPERATION
FIG. 14D — FEATURE REMOVING OPERATION

OPTICAL PATTERN RECOGNITION USING DETECTOR AND LOCATOR NEURAL NETWORKS

FIELD OF THE INVENTION

The present invention relates to a system for performing optical pattern recognition. The inventive system utilizes a first neural network, known as the detector network, for detecting the presence of a particular optical pattern in a bitonal digital image, and a second neural network, known as the locator network, for locating and/or removing the particular optical pattern.

BACKGROUND OF THE INVENTION

The technology of automatically recognizing optical patterns is being developed in the context of numerous applications such as the recognition and processing of routine business documents such as checks.

An optical pattern recognition system typically comprises a scanner for scanning documents which are to be subject to optical pattern recognition. The scanner forms a digital image of the document by illuminating the document with a bright light such as a laser light and then recording the reflected light using storage devices such as CCDs. This type of scanner may be used to form a bitonal image wherein each pixel is either white or black corresponding to state values $+1$ or $-1$.

After being formed by a scanner and recorded in CCD devices, a digital image is then sent to a recognition engine which may be implemented in software in a computer or by special dedicated hardware processing elements. The recognition engine transforms the digital image of a document into information about what symbols have been imprinted on the document. For example, a recognition engine may be utilized to recognize the dollar amount of a check which has been imaged by a scanner. After the symbolic information is obtained from the digital image by a recognition engine, the symbolic information is placed in a database which is stored in a computer memory.

In the recognition engine of an optical pattern recognition system, a variety of systems may be utilized to detect the presence of, and locate or remove, various features. For example, in a recognition engine for personal or business checks, a field finder finds an amount field on the check in which the dollar amount has been written in the form of arabic numerals. Next, an amount isolator detects and removes all the preprinted marks in the amount field such as dollar signs, boxes, or lines. An underscore remover detects and removes the bottom half of the fraction in the dollar amount. A segmenter and recognizer then recognizes the digits in the output of the underscore remover.

One way to implement a recognition engine for recognizing the presence of a particular optical feature or pattern is through use of a neural network. Examples of neural networks suitable for recognizing optical patterns are disclosed in U.S. Pat. No. 4,876,731, and in an article entitled "A Neural Network Model for Selective Attention in Visual Pattern Recognition" written by Kunihiko Fukushima and published in *Biological Cybernetics*, 55, 5–15 (1986).

However, the neural network in the above-identified references is very complex because it utilizes both forward and feedback connections between nodes and the nodes themselves are complex analog devices whose inputs and outputs take on non-negative analog values.

While the recognition systems disclosed in the prior art are usable pattern recognition systems, there is still a need for a simple recognition system which can quickly and reliably detect, and locate or remove, specific optical features from an image. In particular, there is a need for a simple recognition system for detecting, and locating or removing, specific features which have been somewhat distorted in shape or rotated.

It is an object of the present invention to provide such an optical recognition system.

SUMMARY OF THE INVENTION

In accordance with an illustrative embodiment of the present invention, a recognition engine for performing optical pattern recognition comprises a first detector neural network and a second locator neural network. The combination of the detector neural network and the locator neural network is known as a detector-locator network.

The input to a detector-locator network is a bitonal image, i.e. an image in which each pixel is in one of two states, say black or white or state "$-1$" or state "$+1$". Illustratively, the detector network is intended to detect the presence of a specific pattern in the input image.

The detector network is comprised of computing devices called detector nodes. Each node in the detector network is a state machine whose output can be in one of three states: undefined, $-1$ or $+1$. Illustratively, the detector nodes are arranged in a sequence of layers. In each layer, each node is situated at a location which corresponds to a particular pixel in the input image. Thus, in each layer of the detector network there is one node corresponding to each pixel in the input image.

The detector nodes are connected by unidirectional communication channels. If there is a communication channel from node A in one layer in the sequence of layers to node B in the succeeding layer in the sequence, then node A is said to be an input node to node B. The directed graph formed by the nodes and the communication channels is acyclic. In other words, if you start at any node and follow the unidirectional communication channels from node to node, then you will never return to the starting node.

When the detector network begins operating on a particular input image, the state of each detector node in the first detector network layer, known as the input layer, is set to $-1$ or $+1$ according to whether the corresponding pixel in the input image is black or white. At this point the states of the nodes outside the input layer are undefined. The nodes in the input layer are connected to particular nodes in the second layer of the detector network by unidirectional communication channels. In general, the nodes of one layer of the detector network are connected by the unidirectional communication channels to particular nodes in the next layer.

Once the state of all the input nodes to a particular detector node is defined, the particular detector node defines its state in the following manner. First, it computes a weighted sum of the states of all its input nodes. If that sum is above some threshold, it sets its state to $+1$; otherwise, it sets its state to $-1$.

Some or all of the weights used to compute the weighted sum can be negative. In mathematical notation, the state of node B is determined as follows $$s_B = \text{sgn}\left(\left(\sum_{A \in I_B} S_A \cdot w_{A,B}\right) - t_B\right) \quad \text{EQ(1)}$$

where $S_X$ denotes the state of the node X, $I_B$ denotes the set of input nodes to node B, $W_{A,B}$ denote the weight to be multiplied by the state of node A and $t_B$ denotes the threshold utilized.

Because the directed graph formed by the detector nodes and the communication channels is acyclic, once the state of a detector node has been defined as +1 or −1, it does not change for that image.

In the foregoing manner, the states of the detector nodes are defined successively in the layers of the detector network. In an illustrative embodiment of the invention, the detector network finally indicates the presence of a desired pattern by setting a particular node in the highest or output layer of the detector network to a particular state such as +1.

The detector network serves to detect the presence of a specific feature or pattern in an image but not the location in the image of the specific feature or pattern.

The location of the specific feature or object is determined by the locator neural network. Like the detector network, the locator network is comprised of computing devices called nodes. Illustratively, each locator node is a state machine which can be in one of three states: undefined, −1, or +1. There is one node in the locator network which corresponds to every node in the detector network. Thus, the locator nodes may also be arranged in layers corresponding to the layers of the detector network, and each locator node in a layer of the locator network is situated at a location which corresponds to a particular pixel in the input image.

The locator nodes in the highest layer of the locator network, which correspond to detector nodes in the output layer of the detector network, have the same state as the corresponding detector nodes. Other locator nodes set their state according to the following rules:

1. The state of the locator nodes are set in the reverse order from the order in which the state of the corresponding detector nodes were set (e.g., the state of the nodes in the highest layer of the locator network are set first and then the states of the nodes of the lower layers are set successively).
2. The state of a locator node will not be set to +1 unless the state of the corresponding detector node is +1.
3. The state of a locator node, N, will be set to +1 only if the state of a locator node corresponding to a detector node which received a positively weighted input from N's corresponding detector node is +1.

In an illustrative embodiment of the invention, when the foregoing rules are followed, the nodes in the lowest or output layer of the detector network which are set to +1 indicate the location of the desired optical pattern or feature in the original input image.

In short, a feed forward neural network (i.e. a network in which information flows from input nodes, to hidden notes, to output nodes without any feedback) can be used to detect the presence in en image of objects which have been somewhat distorted or rotated. This network is called a detector network. The price paid for the detector network's insensitivity to distortion or rotation is a loss of information at the detector network output nodes about the specific location in the image of the object which has been detected.

Preferably, the output of each detector node can be +1, −1, or undefined. While the detector network nodes have been described as being arranged in layers, this is not necessary to practice the invention. Other arrangements of nodes may be utilized in which information flows from input nodes, to hidden nodes, to output nodes via unidirectional connections. Whatever arrangement of nodes is utilized in the detector network, the directed graph formed by the nodes and unidirectional connections is acyclic.

In the present invention, the detector network is supplemented by a locator network. For every detector node there is a locator node in the locator network. A locator node is fired (i.e. set to +1) only if the corresponding detector node is firing. In addition, a locator node N will fire only if a locator node corresponding to a detector node which received a positively weighted input from N's corresponding detector node is firing. These rules have the consequence that after the output detector nodes have fired, and the signals have had time to propagate back through the locator network to the output locator nodes, the only output locator nodes which fire are those which correspond to pixels forming the particular optical feature to be located.

BRIEF DESCRIPTION OF THE DRAWING

FIG. 2A schematically illustrates a detector neural network for use in the system of FIG. 1.

FIG. 3 illustrates the operation of a node of the detector network of FIG. 2A.

FIG. 4 illustrates the operation of a node in the locator network of FIG. 2B.

FIG. 5 schematically illustrates a recognition engine for recognizing amounts on checks.

FIGS. 14A, 14B, 14C, and 14D show how the locator neural network of FIG. 11 may be utilized to remove an optical feature.

DETAILED DESCRIPTION OF THE INVENTION

Figure 1:
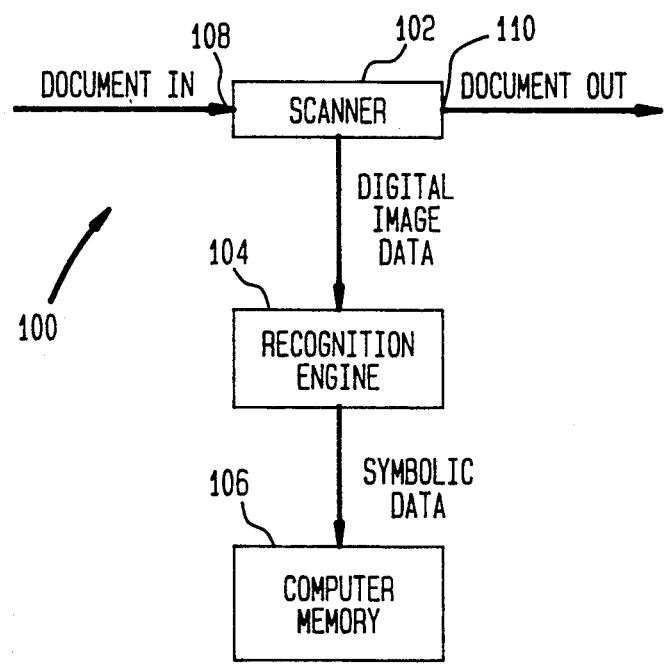
FIG. 1 schematically illustrates an optical pattern recognition system.

A system architecture for an optical pattern recognition system is illustrated in FIG. 1. The optical pattern recognition system 100 comprises the scanner 102, the recognition engine 104, and the computer memory 106. A document enters the scanner 102 at the document input 108 and leaves at the document output 110. The scanner 102 extracts a digital image of the document by illuminating it with a light source and recording the reflected light using storage devices such as CCDs. Illustratively, the recorded digital image is bitonal, i.e., each pixel is black or white, with black corresponding to the logic state −1 and white corresponding to the logic state +1.

The digital image produced by the scanner 102 is outputted to the recognition engine 104. The recognition engine may be implemented in software through use of a general purpose computer or may be implemented in hardware using electronic or optical processing elements. The purpose of the recognition engine is to transform information received from the scanner in the form of a digital image into symbolic information about what symbols are contained in the image.

After the symbolic information is obtained by the recognition engine 104, it is stored in a database in the computer memory 106.

As indicated previously a recognition engine may utilize a detector-locator network comprising a first detector neural network and a second locator neural network to detect the presence of, and to locate or remove, a specific optical feature from the digital image.

Figure 2B:
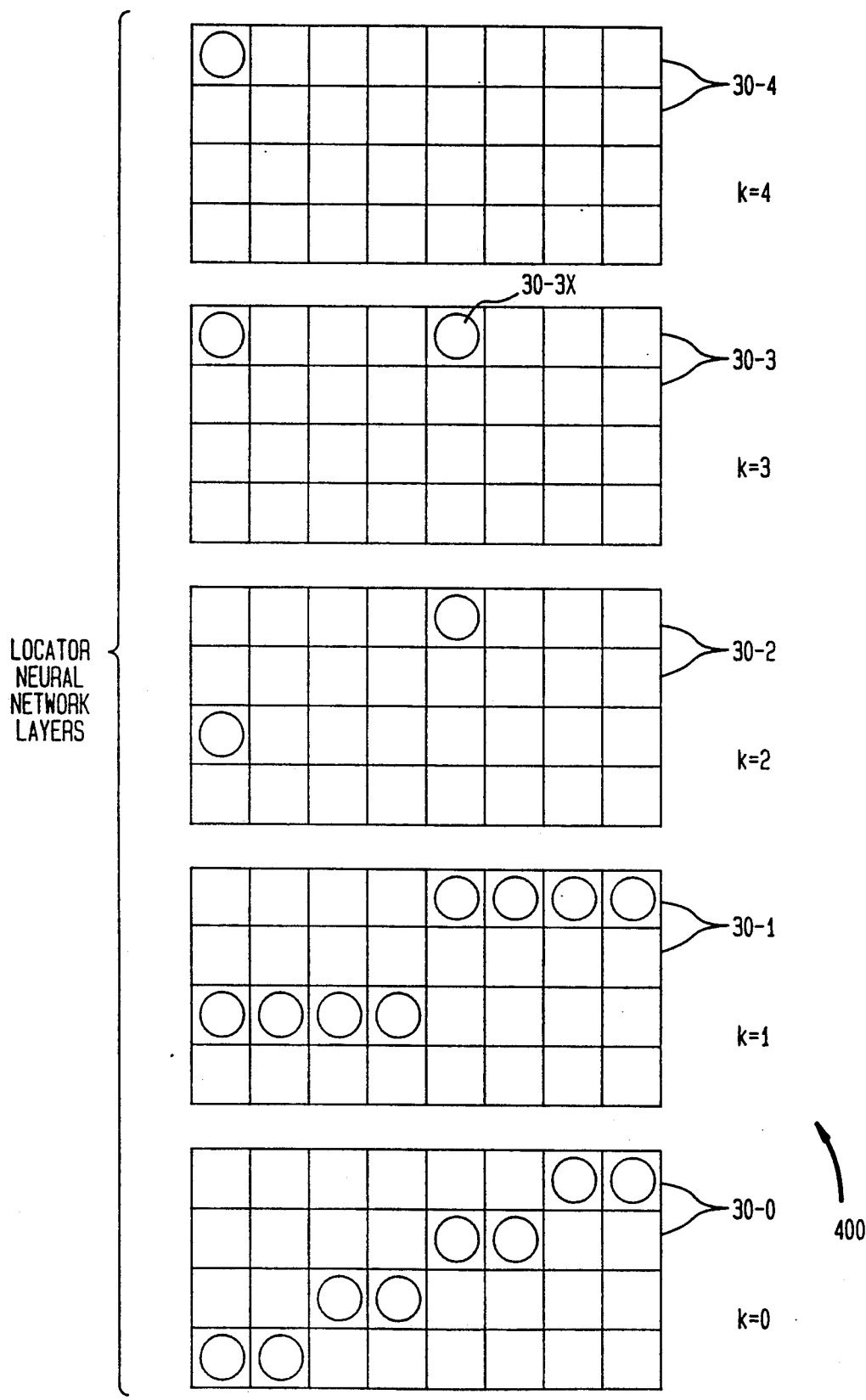
FIG. 2B schematically illustrates a locator neural network for use in the system of FIG. 1.

An example of a detector-locator network is illustrated in FIGS. 2A and 2B. FIGS. 2A schematically illustrates the detector neural network and FIG. 2B schematically illustrates the locator neural network. The detector-locator network illustrated in FIGS. 2A and 2B is designed to detect and locate lines of at least eight pixels in length and having a slope between $-\frac{1}{2}$ and $+\frac{1}{2}$.

The detector neural network 200 of FIG. 2A comprises the layers $j=0,1,2,3,4$. Each of the layers $j=0,1,2,3,4$ comprises an array of nodes 10-j. More specifically, each box 10-j in a layer represents one node. Thus, each layer $j=0,1,2,3,4$ comprises four rows of eight nodes each for a total of thirty-two nodes 10-j. There is one node 10-j in each layer $j=0,1,2,3,4$ of the detector network for each pixel in the input image. Thus, the input image to the detector network 200 of FIG. 2A is a bitonal digital image comprising four rows of eight pixels each where each pixel has the state −1 (black) or the state +1 (white).

Each of the detector nodes 10-j is a state machine whose output can take on the states +1, −1, or undefined. The layer $j=0$ is an input layer, its nodes are set to the state of the corresponding pixels in the input image. The outputs of the nodes in each of the layers $j=0,1,2,3$ are connected by unidirectional communication channels to the inputs of particular nodes in the next higher level in the detector network. Thus, for example, the outputs of the nodes in the layer $j=0$ are connected by unidirectional communication channels to particular inputs of particular nodes in layer $j=1$.

As indicated above, the directed graph formed by the nodes and unidirectional communication channels is acyclic. This means that if you start at any node and then follow the unidirectional communication channels from node to node, you will never return to the start node.

A node 10-j for use in the layer j of the detector network 200 of FIG. 2A is illustrated in greater detail in FIG. 3. The node 10-j has n inputs 11-1, 11-2, ..., 11-n. These inputs are connected by the unidirectional communication paths 17-1, 17-2, ... 17-n to the outputs 12-1, 12-2 ... 12-n of n nodes 10-j-1 in layer j-1 of the network 200. As indicated above, the output of each node 10-j-1 can take on the states +1, −1, or undefined (e.g. zero).

The values of the states of the nodes 10-j-1 are transmitted via the unidirectional communication paths 17-1, 17-2, ... 17-n to the inputs 11-1, 11-2, ..., 11-n. Each of the multipliers 18-1, 12-2, ..., 18-n multiplies the input state of the corresponding input 11-1, 11-2, ..., 11-n with a predetermined weight value $w_1, w_2, \ldots, w_n$.

The outputs of the multipliers 18-1, 18-2, ... 18-n are summed by the adder 19 to form a weighted sum of the input states at the output 20 of the adder 19. A predetermined threshold value $t_j$ is then subtracted from the weighted sum by the threshold subtractor 21. The output of the threshold subtractor 21 is then compared with zero using the comparator 22. The comparator 22 outputs the state +1 at the node output 23 if the output of the threshold subtractor is positive and outputs the state −1 if the output of the threshold subtractor is negative.

Returning now to FIG. 2A, the pattern of communication channels between the nodes in the various layers is considered. Every layer $j=0,1,2,3,4$ in the detector network 200 has what is called the convolutional property. A layer j of nodes has the convolutional property if the following conditions are met:

a. each node in the layer j computes its state using the same threshold as any other node in that layer; and b. if the locations of two nodes in the layer j differ by a vector $\bar{v}$, then the nodes in the layer j-1 from which they receive input differ by $\bar{v}$ and the same weight is used for corresponding inputs.

In the example illustrated in connection with the detector network 200 of FIG. 2A, the input nodes from a layer j-1 to the node in the upper left-hand corner of the layer j are marked in phantom. In addition, the threshold value $t_j$ utilized by the nodes in a layer is noted on the left-hand side of the layer in FIG. 2A.

Thus, for example, the upper left-hand node of the layer $j=1$ has a threshold $t=1$ and receives input from a vertical sub-column of two nodes from the layer $j=0$. Similarly, the upper left-hand node in the layer $j=2$ has a threshold of $t=4$ and receives input from a sub-row of four nodes from the layer $j=1$.

It is now possible to explain how the detector neural network 200 operates to detect the presence in the input image of a line which has a length of at least 8 pixels and a slope between $-\frac{1}{2}$ and $+\frac{1}{2}$. The layer $j=0$ is the input layer. The nodes in the layer $j=0$ are set to +1 or −1 in accordance with the values of the corresponding pixels in the input digital image. In the layer $j=0$, an "x" indicates a node whose output state is −1. The layers $j=1, j=2, j=3$ are intermediate layers. The nodes in these layers are set to +1 or −1 based on the inputs received from the appropriate nodes in the layer below. A node in the layers $j=1, 2,$ or 3 which contains an "x" has an output state of +1.

The layer $j=4$ is the output layer. When the state of the upper left-hand node in the layer $j=4$ has the output state +1, as indicated by the "x" in FIG. 2A, the presence of the desired line in the input image has been detected.

However, there are lots of lines, which if present in the input image, would cause the upper left-hand node in layer $j=4$ to acquire the state +1. The purpose of the locator neural network is to determine which pixels in the input image form the desired line.

The locator neural network 400 is illustrated in FIG. 2B. Like the detector network 200, the locator network 400 is comprised of nodes which are arranged in layers. Each locator node is a state machine which takes on one or more states including the state +1.

More particularly, the locator network 400 is formed from the layers k=4, 3, 2, 1, 0. Each layer k in the locator network 400 of FIG. 2B corresponds to a layer j in the detector network 200 of FIG. 2A. Thus the layer k=4 in the locator network corresponds to layer j=4 in the detector network and the layer k=3 in the locator network corresponds to the layer j=3 in the detector network. In each layer k of the locator network there is one node 30-k which corresponds to each node 10-j in the corresponding layer of the detector network and which also corresponds to each pixel location in the input digital image. Thus, each layer k, k=4, 3, 2, 1, 0 comprises four rows of eight nodes each. The state of the nodes in the locator network 400 are set starting from the input layer k=4, and then successively in the intermediate layers k=3, k=2, k=1 and finally in the output layer k=0.

A node 30-4 in the input layer k=4 of the locator network 400 is set to the state +1 if the corresponding node 10-4 in the output layer j=4 of the detector network 200 has the state +1. In FIG. 2B, a locator node which has the +1 state is indicated by a "circle"

The state of each of the nodes 30-3, 30-2, and 30-1 in the intermediate layers k=3, k=2, and k=1, and each of the nodes 30-0 in the output layer k=0 is set to the state +1 a) if the state of the specific detector node corresponding to the specific locator node is +1, and b) if the state of a locator node which corresponds to a detector node which received positively weighted input from the specific detector node corresponding to the specific locator node is +1.

Consider for example, the node 30-3X in the layer k=3 of the locator network 400 of FIG. 2B. This node is set to the +1 state because a) the corresponding detector node in the layer j=3 of the detector network 200 of FIG. 2B has the +1 state, and b) the upper left locator node in the layer k=4 of the locator network 400 has the +1 state (as this latter locator node has a corresponding detector node which receives positively weighted input from the detector node corresponding to the locator node 30-3X)

As indicated above, the layer k=0 is the output layer in the locator network 400. The nodes in this layer which take the state +1 correspond to the location of pixels in the desired line.

FIG. 4 illustrates the operation of a node 30-2 in the layer k=2 of the locator network. This node illustratively has three inputs 50, 51 and 52. The state at the output 53 of the locator node 30-2 of FIG. 4 is +1 if the input 50 is +1 and at least one of the inputs 51 and 52 is also +1.

The input 50 is obtained via the communications path 60 from the output 61 of the corresponding node 10-2 in the layer j=2 of the detector network. In the illustrative example of FIG. 4, the output 61 of the detector node 10-2 also supplies a positively weighted input to two nodes 10-3 in the layer j=3 of the detector network. The locator nodes 30-3 of the layer k=3 of the locator network illustrated in FIG. 4 correspond to the two detector nodes 10-3 illustrated in FIG. 4. The outputs 71 and 72 of these nodes are transmitted via the communication paths 81 and 82 to the inputs 51 and 52. If the input 50 and at least one of the inputs 51 or 52 are +1, the output 53 is also positive.

In an alternative embodiment, the detector locator network of the present invention may be utilized in a system for recognizing the dollar amount of personal or business checks.

A recognition engine for use in connection with personal or business checks is illustrated in FIG. 5. The recognition engine 104 of FIG. 5 comprises a field finder 124. The field finder 124 receives a digital image of a check from a scanner and finds the amount field where the check amount is written in arabic numerals. Next the amount isolator 126 tries to remove all preprinted remarks from the amount field such as horizontal and vertical lines and possibly also the dollar sign. The output of the amount isolator is connected to the underscore remover 128. The underscore remover 128 removes the bottom half of the fraction in the dollar amount of the check. The segmenter and recognizer 130 then tries to recognize the digits in the output of the underscore remover.

Figure 6:
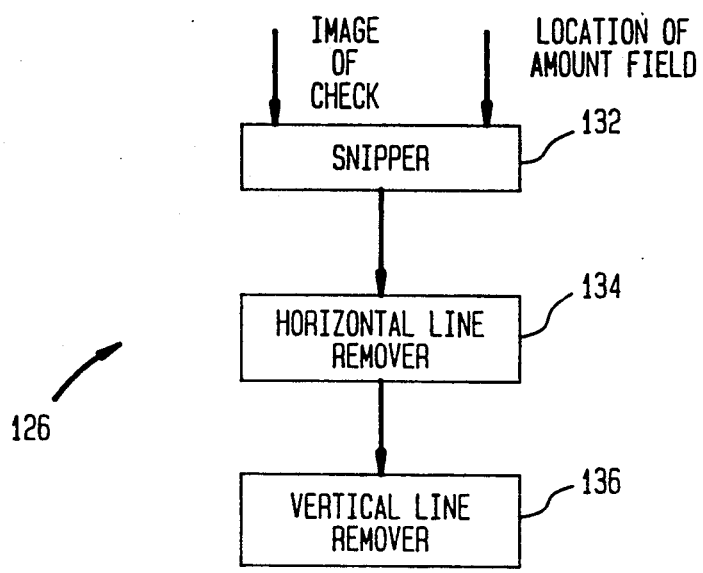
FIG. 6 schematically illustrates an amount isolator for use in the recognition engine of FIG. 5.

The amount isolator 126 is illustrated in greater detail in FIG. 6. The snipper 132 receives the digital image of the check and information from the field finder 124 (see FIG. 5) as to where the amount field is located. The snipper 132 creates a subimage which contains an area just large enough to ensure that it contains the dollar amount. Any preprinted dollar sign can be excluded from this area. The horizontal line remover 134 then finds and removes any sufficiently long horizontal lines, which for example border the area containing the dollar amount, and passes information about their extent to the vertical line remover 136. The vertical line remover 136 then finds and removes any vertical lines which may border the amount area.

Figure 7:
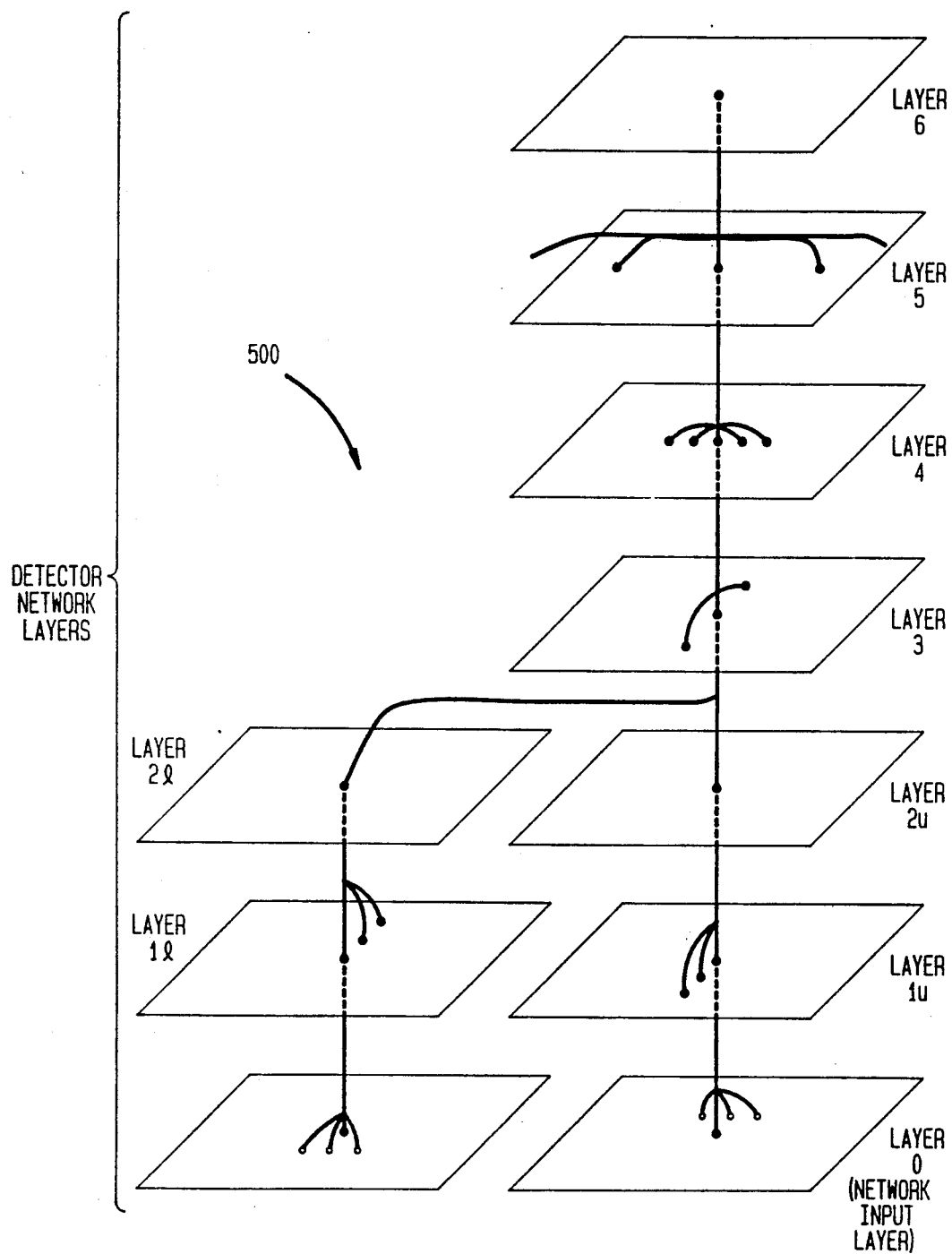
FIG. 7 schematically illustrates a detector neural network for use in the amount isolator of FIG. 6.

FIG. 7 illustrates the detector portion of a detector-locator network which is designed to implement the horizontal line remover 134 of FIG. 6. The detector neural network 500 described in connection with FIG. 7 is intended to work on images which have, for example, 150 pixels per inch.

The purpose of the detector neural network 500 of FIG. 7 is to detect horizontal or nearly horizontal lines which are roughly 1 inch long and at most 1/28 of an inch thick. As shown in FIG. 7, the network 500 comprises the layers, 0, 1u, 1l, 2u,2l, 3, 4, 5, and 6. Each of the layers comprises an array of detector nodes which operate in the manner described above, there being one node in each layer corresponding to each pixel in the input image.

In FIG. 7 the network input layer, i.e. the layer 0, is at the bottom, and for the sake of the illustration, has been drawn twice. The state of each node in the input layer is set to +1 or −1 depending on the state of corresponding pixel in the input sub-image. Each other layer except layer 3 receives input from the layer directly below it. Layer 3 receives input from two layers, layer 2l and layer 2u.

Each layer has the convolutional property defined above. For each layer, the input nodes to a single node in the layer have been marked in the layer (or layers) below. If the weight associated with that input node is 1, then the node is marked with a solid black dot. If the weight associated with that input node is −1, then the node is marked with a small circle.

If we denote by $s^r_{p,q}$ the state of the node in row p and column q of layer r, then we can give the entire design of the detector network with the following equations:

$$s^{1l}_{i,j} = sgn(s^0_{i,j} - s^0_{i-1,j-1} - s^0_{i-1,j} - s^0_{i-1,j+1} - 3) \quad (EQ2)$$

$$s^{1u}_{i,j} = sgn(s^0_{i,j} - s^0_{i+1,j-1} - s^0_{i+1,j} - s^0_{i+1,j+1} - 3) \quad (EQ3)$$

$$s^{2l}_{i,j} = sgn(s^{1l}_{i,j} + s^{1l}_{i+1,j} + s^{1l}_{i+2,j} - 2) \quad (EQ4)$$

$$s^{2u}_{i,j} = sgn(s^{1u}_{i,j} + s^{1u}_{i-1,j} + s^{1u}_{i-2,j} - 2) \quad (EQ5)$$

$$s^3_{i,j} = sgn(s^{2l}_{i,j} + s^{2u}_{i,j} - 1) \quad (EQ6)$$

$$s^4_{i,j} = sgn(s^3_{i-1,j} + s^3_{i,j} + s^3_{i+1,j} - 2) \quad (EQ7)$$

$$s^5_{i,j} = sgn(s^4_{i,j-2} + s^4_{i,j-1} + s^4_{i,j} + s^4_{i,j+1} + s^4_{i,j+2} - 4) \quad (EQ8)$$

$$s^6_{i,j} = sgn\left(\left(\sum_{k=-15}^{15} s^5_{i,j+5k}\right) - 8\right) \quad (EQ9)$$

A more intuitive feel for this design can be appreciated by watching the network operate on a specific example. The pictures in FIGS. 8A, 8B, 8C, 8D, 9A, 9B, 9C, 9D, show the results of the operations performed by the various layers in the network 500 when applied to a specific example. In each of these Figures, the nodes of the input layer (i.e. layer 0) which have the state +1 are represented by squares shaded using hatch #1 of FIG. 15. The nodes in the particular layer which have state +1 after processing by that layer are represented by squares of hatch #2 or hatch #3 of FIG. 15. In these Figures, a square which is hatched using hatch #2 or hatch #3 may also be hatched with hatch #1. Table 1 below provides a correspondence between FIGS. 8A, 8B, 8C, 8D, 9A, 9B, 9C, 9D and particular layers of the network 500 of FIG. 7, and indicates briefly the operation performed by each layer.

TABLE 1

| layer | FIG. | label |
|---|---|---|
| 1l | 8A | lower edges |
| 1u | 8B | upper edges |
| 2l | 8C | lower edges smeared up |
| 2u | 8D | upper edges smeared down |
| 3 | 9A | upper lower pairs |
| 4 | 9B | vertical smear of pairs |
| 5 | 9C | horizontal smear of pairs |
| 6 | 10A | before lateral inhibition |

Heuristically, layers 1l, 1u, 2l, 2u, and 3 are based on the idea that a horizontal line is made up of pairs of upper and lower edges which are not too far apart. Layer 4 is designed to allow some rotation of the horizontal line. (Actually, the vertical smearing of layers 2l and 2u also allow for some rotation, but only if the horizontal line is not of the full thickness.) Layers 5 and 6 say that parts of the horizontal line should appear at least once in at least 20 out of 31 non-overlapping 5 pixel wide sectors.

To improve the performance of the detector network 500 of FIG. 7 the processing performed by the nodes in layer 6 may be altered to include some lateral inhibition because in the amount field of a check, the horizontal lines to be removed are generally no longer than one inch. The nodes in the alternative layer 6 then set their state to +1 or −1 based on the following. Let A (i,j) be defined by $$A(i,j) = \left(\sum_{k=-15}^{15} s^5_{i,j+5k}\right) - 8. \quad (EQ10)$$

In other words, A(i,j) is the argument of the sgn function in equation (EQ 9). Then the state of a node in the alternative layer 6 in row i and column j is set to +1 if A(i,j) is greater than 0 and if A(i,j) equals the maximum value of A in some neighborhood of (i,j). Otherwise the state is set to −1.

Figure 10A:
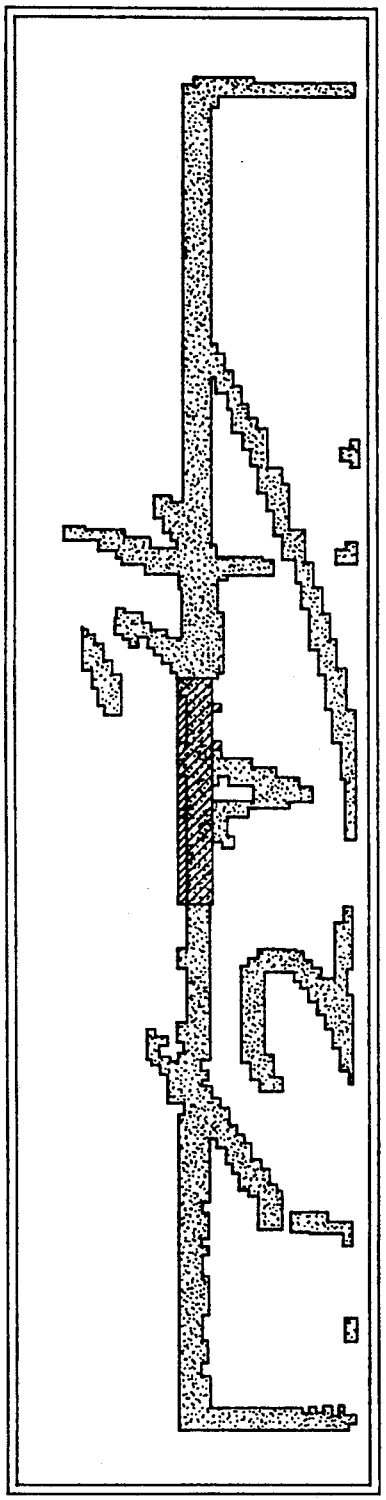
Figure 10B:
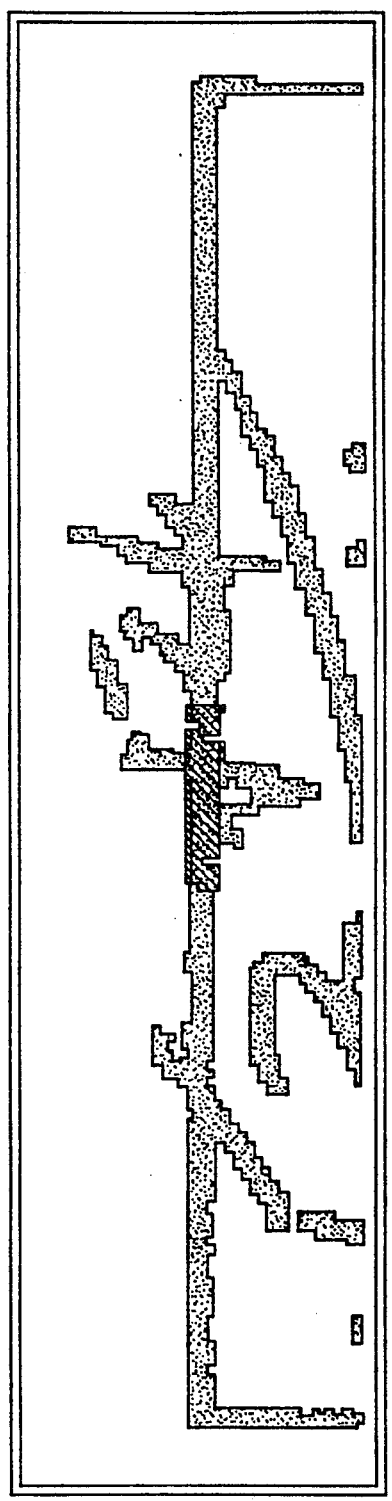

The result of the operations performed by the alternative layer 6 in the above-described example are illustrated in FIG. 10B.

Figure 11:
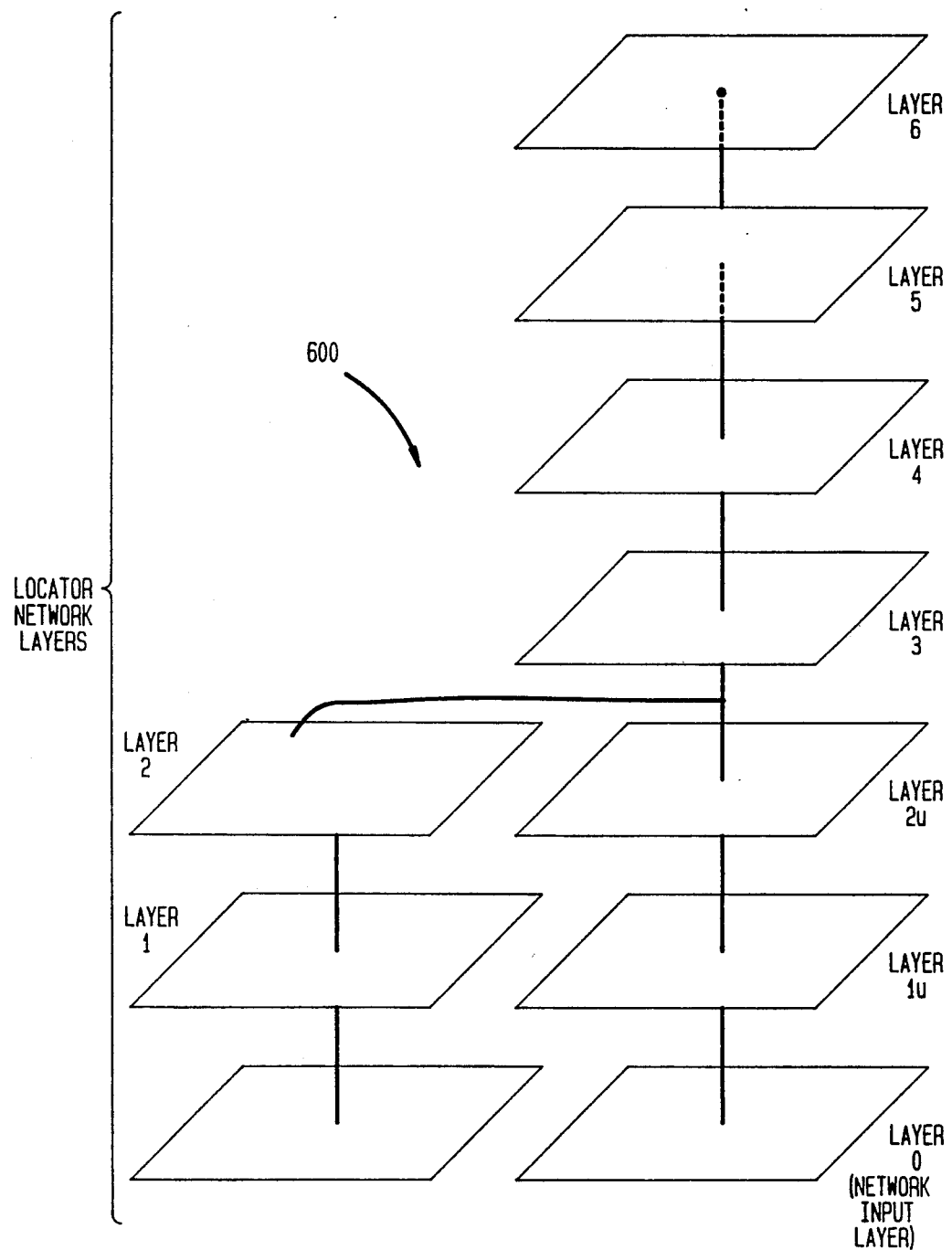
FIG. 11 illustrates a locator neural network for use in the amount isolator of FIG. 6.
Figure 12A:
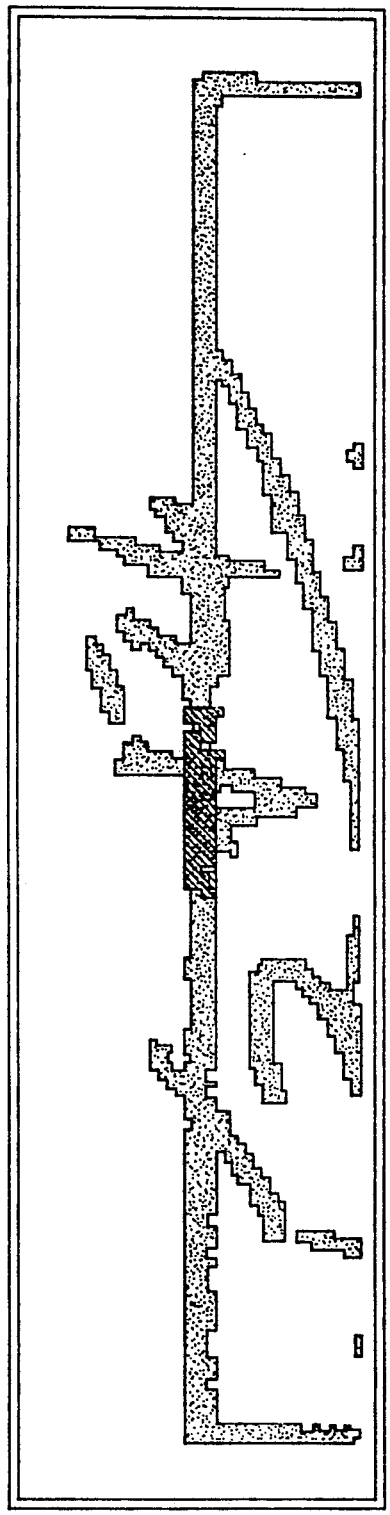
FIGS. 12A, 12B, 12C, 12D, 13A, and 13B illustrate the results of operations performed by the various layers in the locator neural network of FIG. 11.
Figure 12B:
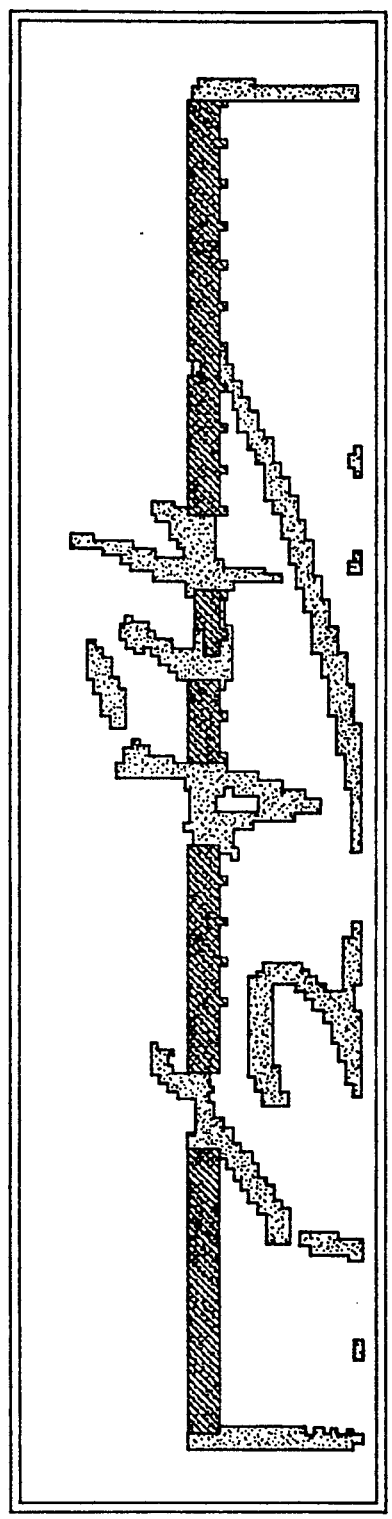
Figure 12C:
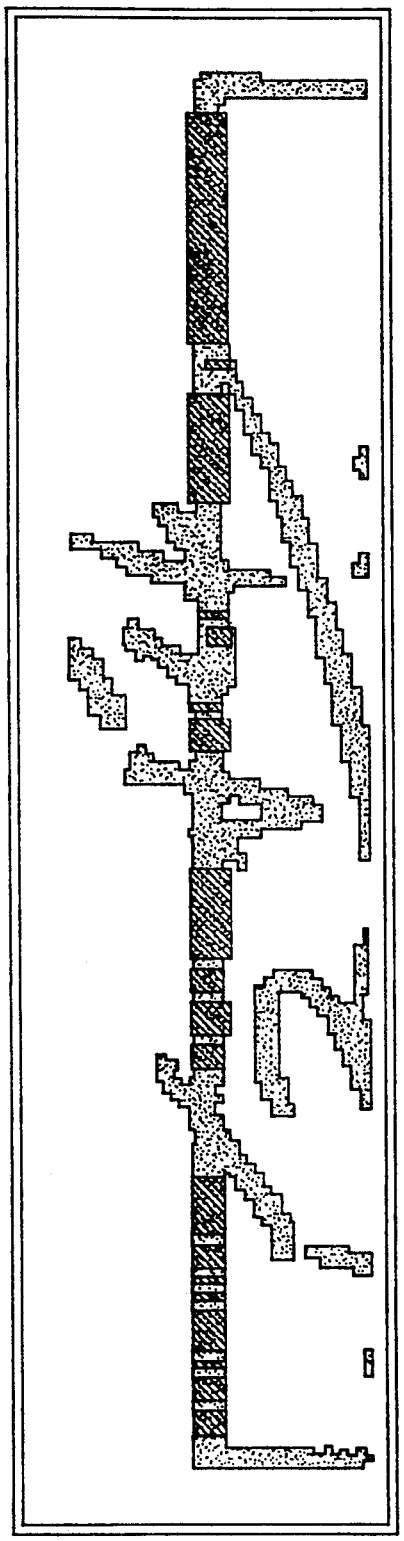
Figure 12D:
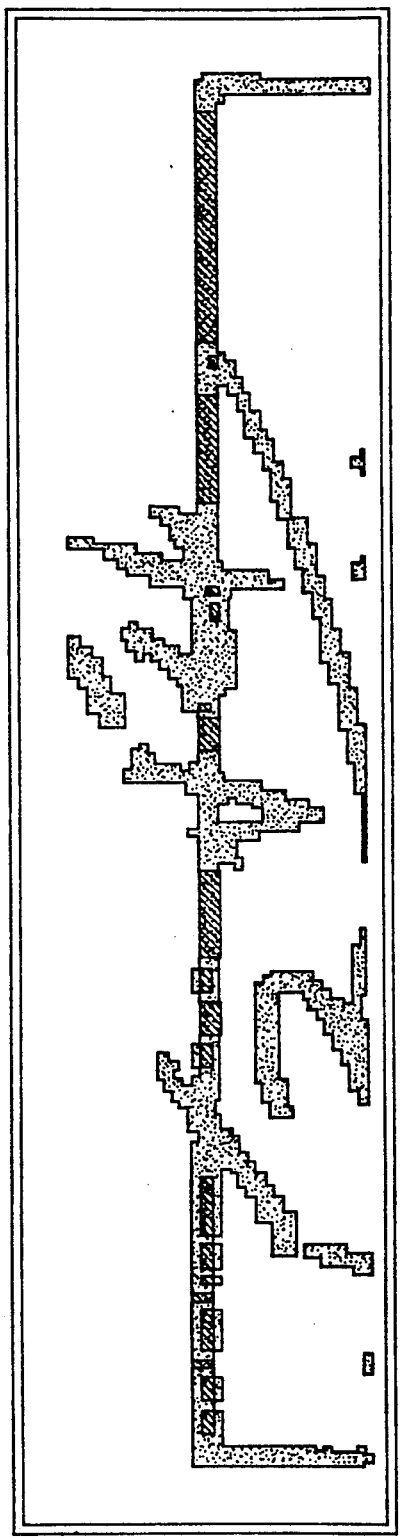

After the detector network detects the presence of a horizontal line, a locator network is utilized to locate and remove the line. The locator network is illustrated in FIG. 11. The locator network 600 of FIG. 11 includes one layer corresponding to each layer in the detector network 500 of FIG. 7. There is one locator node for each detector node. The locator nodes set their state according to the rules described above. Layer 0 of the locator network is the logical "or" of layers 1l and 1u of the locator network.

The results of the operations performed by the layers in the locator network 600 of FIG. 11 is illustrated in FIGS. 12A, 12B, 12C, 12D, 13A, 13B. Table 2 below shows the correspondence between these Figures and the layers in the network 700 as well as provides a brief description of the operations performed by each layer.

TABLE 2

| layer | FIGS. | label |
|---|---|---|
| 6 | 12A | after lateral inhibition |
| 5 | 12B | horizontal smear of pairs (inverse) |
| 4 | 12C | vertical smear of pairs (inverse) |
| 3 | 12D | upper lower pairs (inverse) |
| 2l | 12D | lower edges smeared up (inverse) |
| 2u | 12D | lower edges smeared down (inverse) |
| 1l | 13A | lower edges (inverse) |
| 1u | 13B | upper edges (inverse) |

Figure 8A:
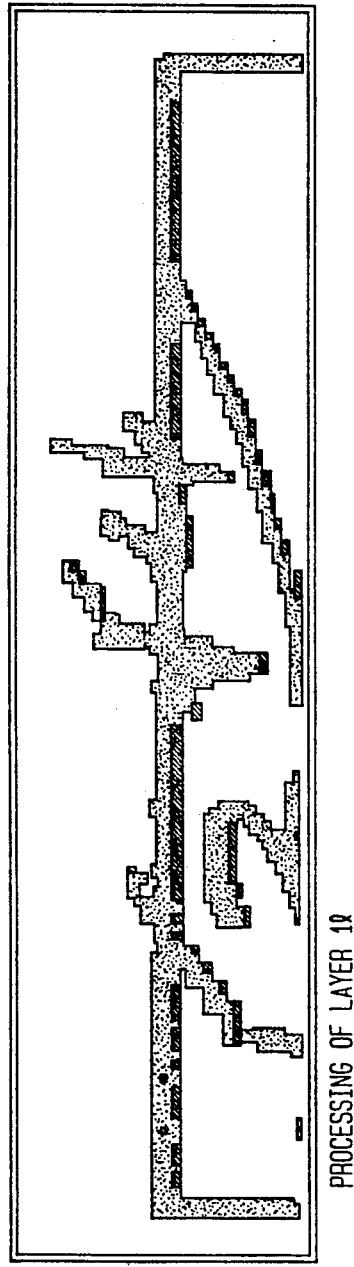
FIGS. 8A, 8B, 8C, 8D, 9A, 9B, 9C, 10A and 10B illustrate the results of the operations performed by the various layers in the detector neural network of FIG. 7.
Figure 8B:
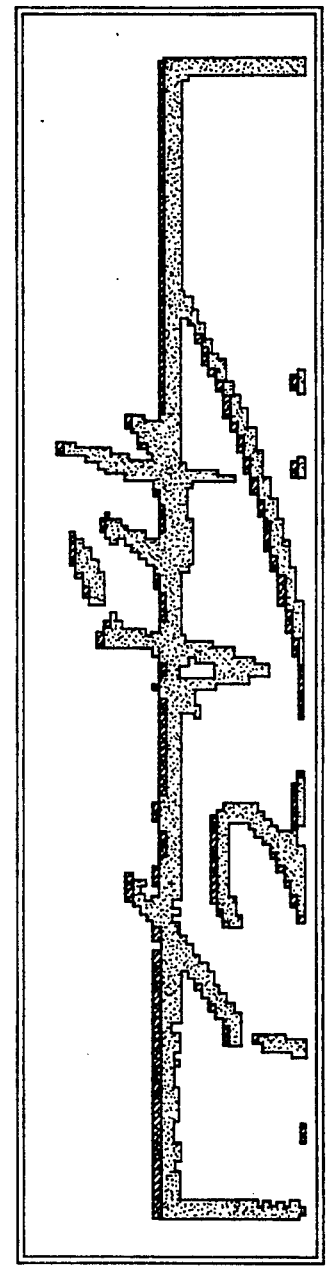
Figure 8C:
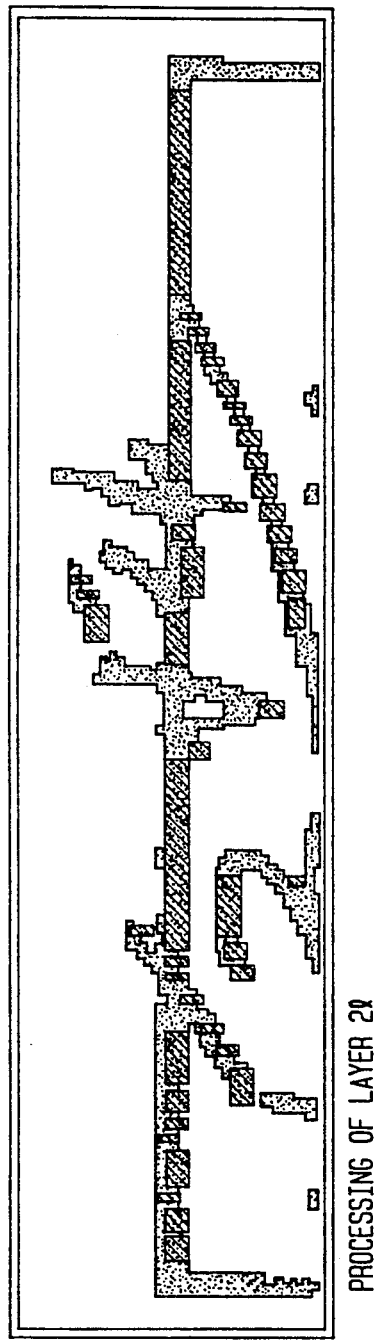
Figure 8D:
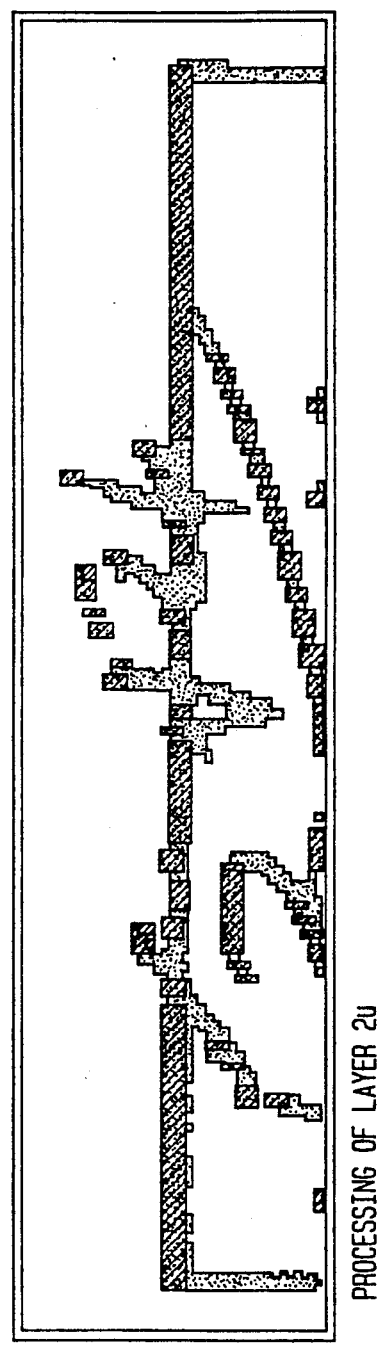
Figure 9A:
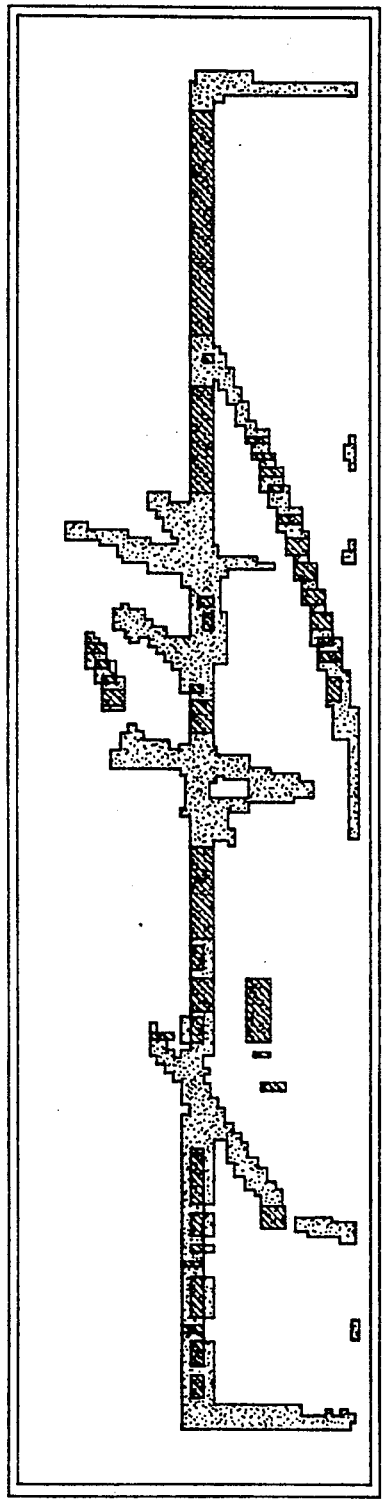
Figure 9B:
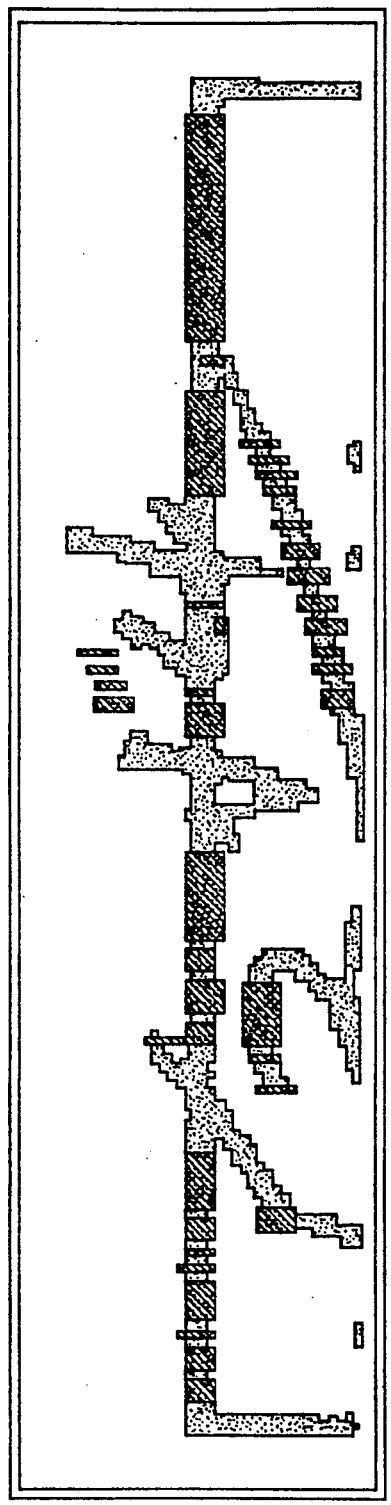
Figure 9C:
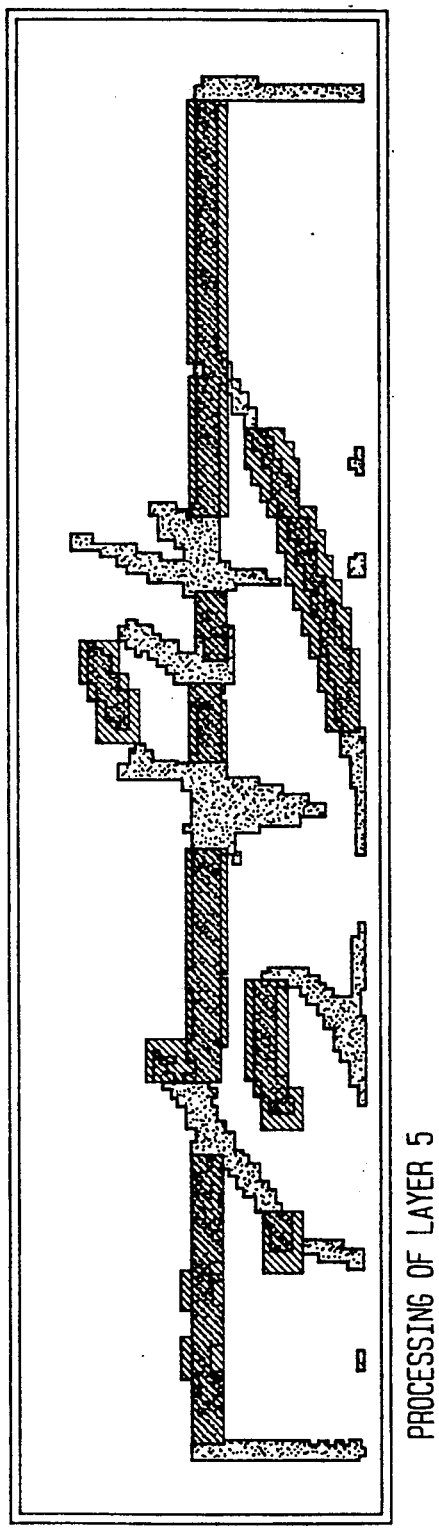
Figure 13A:
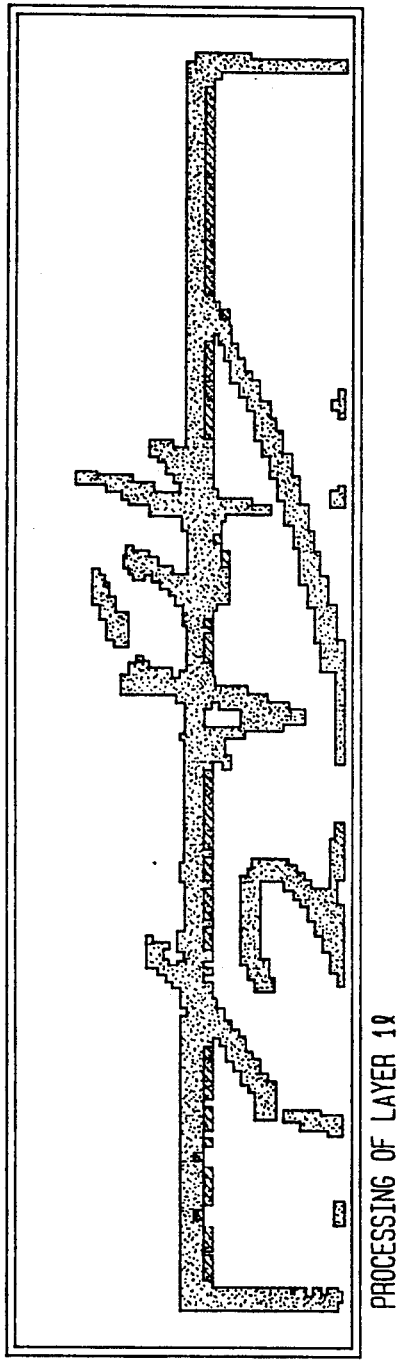
Figure 13B:
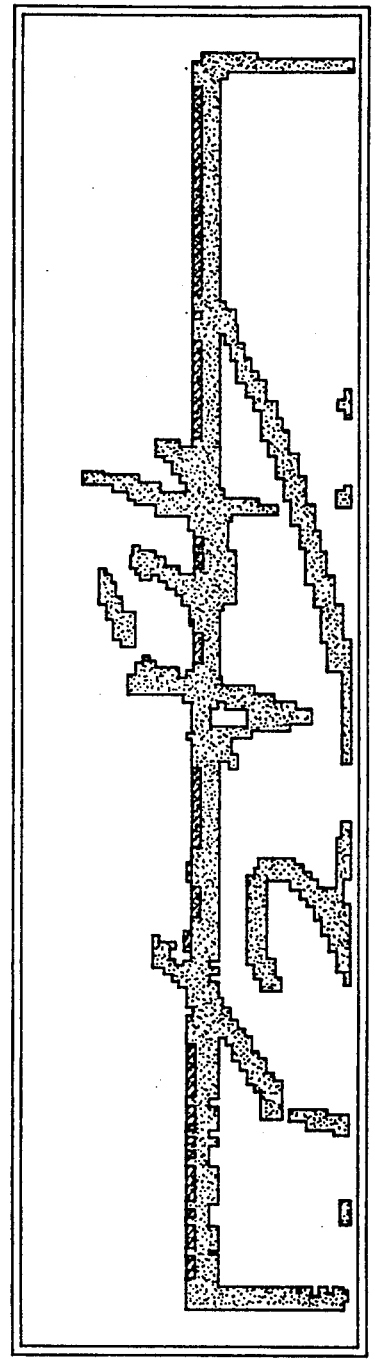

The locator network 600 of FIG. 11 may be utilized to remove a horizontal line. To remove the horizontal line, the information in layers 1l and 1u of the locator network are utilized. As shown in FIGS. 13A and 13B, almost all of the nodes with state +1 in layer 1l of the locator network are actually on the lower edge of the long horizontal line. This is in sharp contrast to layer 1l of the detector network as shown in FIG. 8A. The situation is similar for upper edges.

Figure 14A:
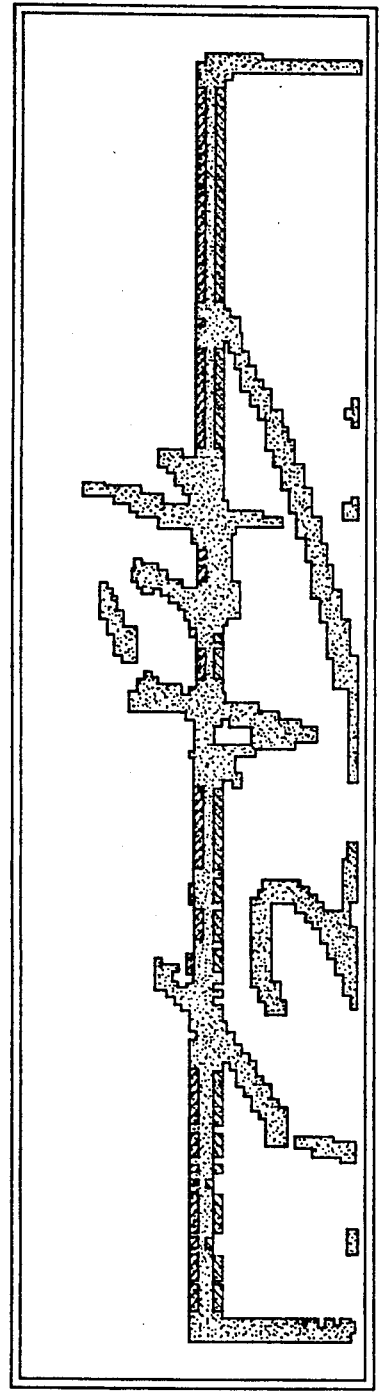

The first step is to remove any lower (resp. upper) edges which are in layer 1l (resp. 1u) of the locator network but which are not on the horizontal line. This is done by fitting a line to the lower (resp. upper) edges in layer 1l (resp. 1u) of the locator network and then turning off (i.e., setting of state to −1) any edge pixels which are too far from the line. The results of this operation are shown in FIG. 14A.

Figure 14B:
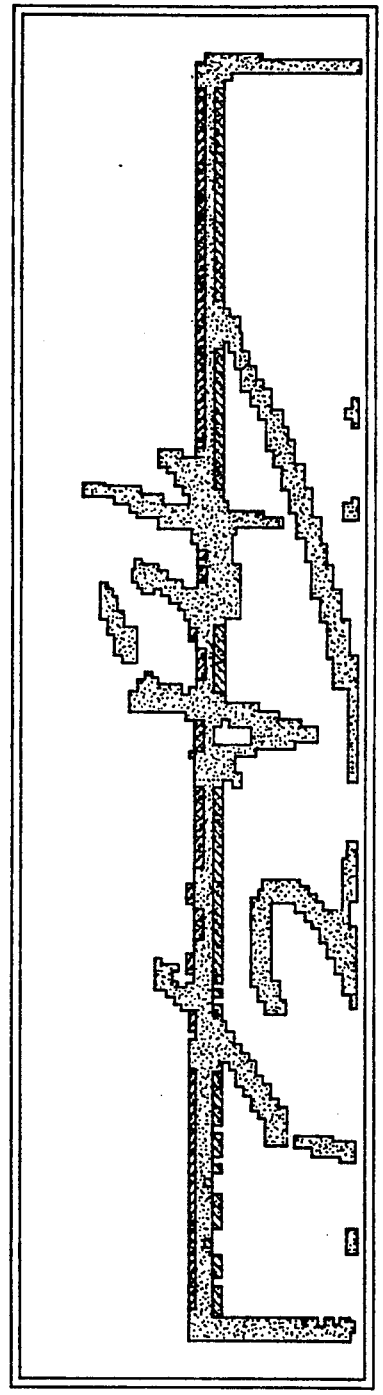

The next step is to turn back on any edges which are on the lines found in the previous step. The results of this can be seen in FIG. 14B.

The next step is to smear horizontally by 1 pixel in either direction. The results of this can be seen in FIG. 14C.

Figure 15:
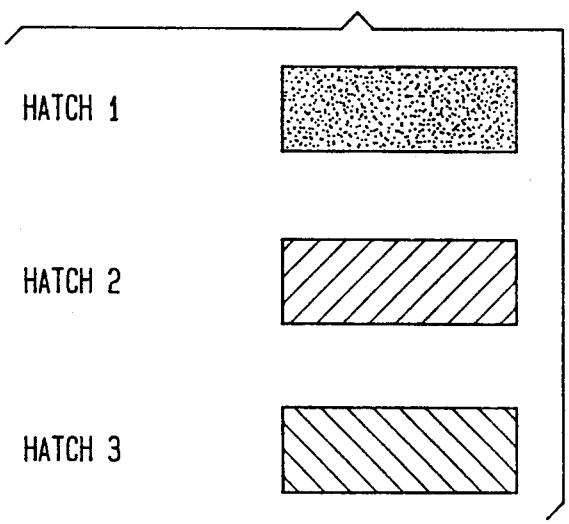
FIG. 15 contains a key which aids in interpreting FIGS. 8A, 8B, 8C, 8D, 9A, 9B, 9C, 10A, 10B, 12A, 12B, 12C, 12D, 13A, 13B, 14A, 14B, 14C and 14D.

The final step is to turn off the pixels which are above a lower edge and below an upper edge in the output of the previous step. The results of this operation are illustrated in FIG. 14D. The pixels shaded using hatch #3 of FIG. 15 are the pixels which have been turned off.

Please note the following two important properties of this horizontal line removal process which are illustrated in this example.

1. Where the horizontal line is crossed or touched by a sufficiently vertical line, that vertical line is not broken. This is illustrated by the "5" in the middle of FIG. 14D and the "4" to its right.
2. If a horizontal line is drawn adjacent to but not totally overlapping the long horizontal line, there is a good chance it will not be totally removed. This is illustrated by the rightmost digit in FIG. 14D (i.e., the "4").

In short, a system for performing optical character recognition comprises a first detector neural network and a second locator neural network. Finally, the above-described embodiments of the invention are intended to be illustrative only. Numerous alternative embodiments may be devised by those skilled in the art without departing from the spirit and scope of the following claims.

We claim:

1. A system for processing an image comprising
   a generator for generating electronic signals representative of a digitized image, and
   a recognition engine for receiving the digitized image generated by said generator and for electronically converting information contained in said digitized image into symbolic form, and
   a memory for storing said information in symbolic form,
   said recognition engine including:
      a first detector neural network comprising a plurality of detector nodes selectively interconnected only by forward feeding communication channels for receiving said digitized image produced by said generator as an input and for outputting an indication as to whether or not a particular optical pattern is present in said digitized image, and
      a second locator neural network comprising a plurality of locator nodes including one locator node corresponding to each detector node in said detector network, for receiving as an input the output of said detector network and for outputting an indication of the location of said optical pattern in said image.

2. The system of claim 1 wherein said system includes means for removing pixels comprising said pattern from said image.

3. The system of claim 1 wherein said generator for generating a digitized image comprises a scanner for receiving a document and scanning the document.

4. The system of claim 1 wherein said digitized image is a bitonal image comprising pixels each of which is represented by a first predetermined state or a second predetermined state.

5. The system of claim 4 wherein in each layer of said detector neural network there is one detector node for each pixel in said digitized image.

6. The system of claim 5 wherein each detector node in said detector neural network has one or more inputs and an output which can take on a first predetermined state, a second predetermined state, or an undefined state.

7. The system of claim 6 wherein said detector neural network comprises an input layer, wherein the detector nodes in the input layer are set to the states of the corresponding pixels in the digitized image, a plurality of intermediate layers, and an output layer arranged in sequence, the detector nodes in the input and intermediate layers being connected by said forwarding feeding communication channels to particular detector nodes of the next layer in the sequence.

8. The system of claim 7 wherein two or more of the intermediate layers are arranged in parallel.

9. The system of claim 7 wherein the detector nodes in the output layer of the detector network indicate the presence of said pattern in said digitized image but not the location of said pattern in said digitized image.

10. The system of claim 9 wherein each node in said intermediate and output layers of said detector network comprises summing means value for forming a weighted sum of input state values, subtracting means for subtracting a threshold value from the weighted sum, and means for determining the algebraic sign of the subtracting means output.

11. The system of claim 9 wherein said locator neural network comprises an input layer corresponding to the output layer of the detector network, a plurality of intermediate layers corresponding to the intermediate layers of said detector network, and an output layer corresponding to the input layer of the detector network, each layer in said locator network comprising one locator node which corresponds to each detector node in the corresponding layer of the detector network and which also corresponds to one pixel in said digitized image.

12. The system of claim 11 wherein said locator nodes in said locator network can take on said first predetermined state.

13. The system of claim 12 wherein the locator nodes in the input layer of the locator network take on the same states as the corresponding detector nodes in the output layer of the detector network.

14. The system of claim 13 wherein the states of the locator nodes in the intermediate layer and output layer of the locator network are set in the reverse order of the corresponding layers in the detector network.

15. The system of claim 14 wherein the state of a specific locator node in an intermediate or output layer of the locator network is set to said first predetermined state
   a) if the output of the specific detector node corresponding to the specific locator node has the first predetermined state, and
   b) if the state of a locator node which corresponds to a detector node which receives a positively weighted input from the specific detector node is in the first predetermined state.

16. The system of claim 15 wherein the locator nodes in the output layer of the locator network which take said first predetermined state correspond to the pixels of the optical pattern.

17. The system of claim 1 wherein said generator for generating a digitized image comprises
   a scanner for scanning and digitizing a document, and
   field finding means for finding a particular field in the digitized document.

18. The system of claim 17 wherein said business document is a check, wherein said field finding means finds an amount field on said check, and wherein said optical pattern is a line which forms a border of said amount field.

19. The system of claim 1 wherein each layer of detector nodes in said detector network has the convolutional property.

20. A method for processing an image comprising the steps of:

generating electronic signals representative of a digitized image, and electronically converting information contained in said digitized image into symbolic form using an optical recognition engine, said step of electronically converting comprising detecting and locating an optical pattern in said digitized image by the steps of inputting said digitized image into a first detector neural network comprising a plurality of detector nodes selectively interconnected only by forward feeding communication channels and outputting from said detector neural network an indication as to whether or not said optical pattern is present in said image, and inputting the output of said detector network into a second locator neural network comprising a plurality of locator nodes including one locator node corresponding to each detector node and outputting from said locator network an indication of the location of said pattern in said digitized image, said method further comprising the step of storing said symbolic information outputted by said recognition engine into a memory.

21. The method of claim 20 wherein said method comprises the step of removing the pixels in said digitized image which form said optical pattern.

* * * * *